July 25, 1961   Z. J. JAGIEL   2,993,255
TUBE CLAMP
Filed March 17, 1960
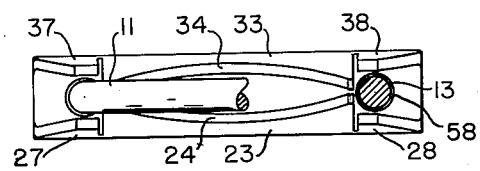
Fig. III
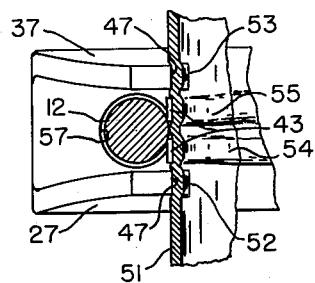
Fig. IV
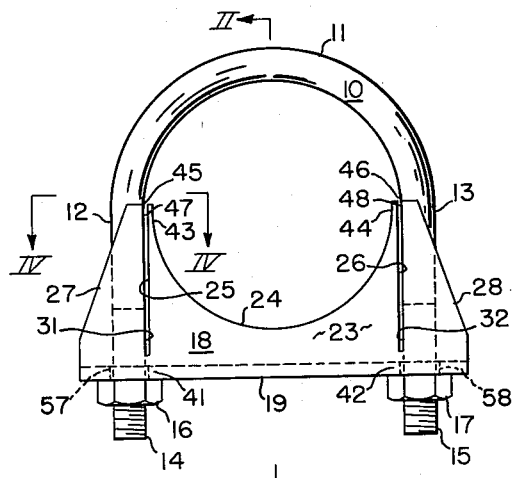
Fig. I
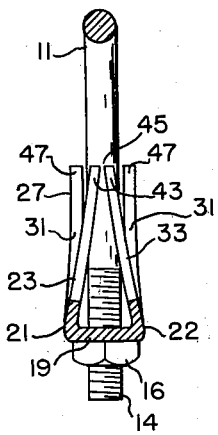
Fig. II
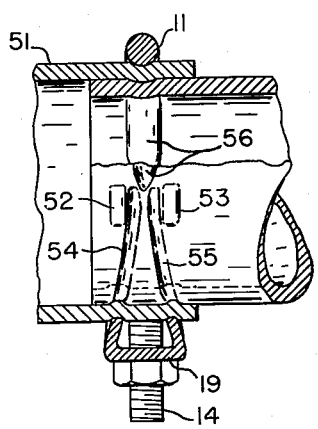
Fig. V
INVENTOR.
ZIGMUND J. JAGIEL
BY
Marshall + Wilson
ATTORNEYS United States Patent Office 2,993,255
Patented July 25, 1961

2,993,255
TUBE CLAMP
Zigmund Joseph Jagiel, 3106 Algonquin Parkway,
Toledo, Ohio
Filed Mar. 17, 1960, Ser. No. 15,645
8 Claims. (Cl. 24—277)

This invention relates to tube clamps and more particularly to clamps for sealing telescoped tubes together.

Heretofore, substantial effort has been undertaken to develop clamps for telescoped tubes which would seal the two tubes together in order to make them gas-tight. Seals of this nature are particularly desirable where fluids are conveyed within the tubes as in the case of an exhaust system for an internal combustion engine, the couplings for irrigation systems and the like. Several designs have been developed with the object of developing a substantially continuous line of high pressure beneath the clamp and upon the surface of the outer telescoped tube over its entire circumference in order to distort the outer tube sufficiently to bring it into contact over a closed path with the tube it encompasses. One form of such clamp generally employed heretofore has included a U-bolt and a cooperating saddle provided with an arcuate cutout generally conforming to the cross-sectional shape of the tube to be clamped. A major difficulty is encountered in constructions of this nature in the region of the juncture of the saddle and U-bolt inasmuch as pressures developed in that region are normally at a minimum and are frequently insufficient to effect an adequate seal.

In accordance with the above, a principal object of this invention is to improve the seals between telescoped tubes. Another object is to simplify the construction of an efficient seal for tubes. A further object is to reduce the amount of material required in the construction of a sealing tube clamp. An additional object is to eliminate the complexities of mounting an assembly of sealing tube clamps.

In accordance with the present invention, these objects are realized by a tube clamp consisting of a U-bolt cooperating with a novel saddle construction wherein a line of pressure developed beneath the U-bolt over essentially half of the cross-section of the tube being clamped is complemented by overlapping lines of pressure developed under edges or lips of the saddle. The saddle is of channel form having bottom and side walls extending therefrom. These side walls are formed with arcuate cutouts which are extensions of the arc of the U-bolt and complement that arc by spanning the legs of the bolt. The edges of the cutouts form lips which when applied to a tube correspond to the pressure area under the U-bolt. When the lips extend beyond a diameter of the arc, they develop areas of pressure spanning the U-bolt arms and in overlapping relation to the pressure areas beneath the U-bolt. Additional pressure regions are produced adjacent the ends of those formed by the bight and lips and overlapping those regions to insure a seal in that area. These regions of pressure are obtained by dividing the side walls of the channel and forcing edges of the divided portions against the tube. In the preferred embodiment this division is substantially along a line paralleling the inner face of the leg of the U-bolt with which the saddle cooperates and extends substantially to the bottom of the channel so that a center portion having an arcuate cutout is separated at either end from end portions. The center and end portions are offset with respect to each other along the tube axis. The regions of the center portion most remote from the bottom of the channel are displaced inwardly toward each other advantageously so that they engage the inner face of the legs of the U-bolt with their outer limits. When pressure is applied to the bottom of the saddle structure along the shanks of the U-bolt, the end portions of the side walls have a moment applied to them tending to cause them to rotate about the bottom of the channel in the region immediately below their separation from the center portion of the side walls. As they turn about this fulcrum, they function as bell cranks and their inner sides are forced against the sides of the tube inasmuch as they are offset with respect to the center portion. Thus, an effective seal is formed by the single line of pressure beneath the U-bolt which joins double lines of pressure produced by the edges of the arcuate cutouts in the saddle and the sealing effect of those lines is augmented in the region in which the lines of pressure join by additional pressure areas developed by the end portions of the saddle.

The above and other objects and features of this invention will be more fully appreciated from the following detailed description when read with reference to the accompanying drawing wherein:

FIG. I is an elevation view of the sealing tube clamp of this invention;

FIG. II is an end view of the clamp of FIG. I;

FIG. III is a plan view of the clamp to FIG. I with portions of the U-bolt broken away to better reveal the details of construction;

FIG. IV is a fragment of one side of the U-bolt and saddle construction taken at the line IV—IV of FIG. I illustrating the effect of the clamp on the tube embraced thereby; and FIG. V is a view of the clamp in combination with a pair of telescoped tubes taken along the line V—V of FIG. I.

The clamp comprises a U-bolt 10 having a bight 11 and a pair of legs 12 and 13 having threaded portions 14 and 15 at their ends for the reception of nuts 16 and 17. Cooperating with the U-bolt is a saddle 18 made up in the form of a channel having a bottom 19 and side walls 21 and 22. The side wall 21 is divided into three portions, a center portion 23 having an arcuate cutout defined by the edge or lip 24 and limited along the length of the channel by slots bounded by ends 25 and 26. The clamp illustrated is adapted for utilization on a circular tube. Accordingly, the bight of the U-bolt defines a semi-circle and the arcuate cutout defined by edge or lip 24 of the central portion of side 21 also approximates a semi-circle advantageously of slightly smaller diameter than that encompassed by the bight 11. End portions 27 and 28 of channel side 21 are separated from the central portion 23 by edges 31 and 32, respectively, defining their inner limits. Side portions 27 and 28 have substantial width throughout their lengths in order to afford rigidity and are oriented to lie along the legs 12 and 13 of the U-bolt.

As can best be seen in FIGS. II and III, side wall 22 of the saddle is formed in a manner similar to side wall 21 with a central portion 33 having an arcuate cutout 34 and end portions 37 and 38 extending along the legs 12 and 13, respectively, of the U-bolt. The offset of center portions 23 and 33, particularly at their regions more remote from the bottom 19 of channel form saddle 18, is evident in FIGS. II and III. This offset provides the clearance permitting the side members 27 and 37 and the side members 28 and 38 to pivot around the bottom of the channel 19 in the regions 41 and 42 immediately adjacent the ends of the slots or separations between the center portions 23 and 33 and the end portions of the side walls.

When the nuts 16 and 17 are tightened on the threaded portions 14 and 15, respectively, and a tube is encompassed by the clamp, the lips or edges 24 and 34 of the center portion of the clamp are advanced against the tube wall. As further pressure is applied by those edges, the tube tends to flatten somewhat and extend itself transverse of the legs of the U, thereby forcing the ends 43 and 44 of the center section against the inner face 45 and 46, respectively, of the U-bolt legs. The edges 43 and 44 tend to bite into the faces 45 and 46 and the ends 43 and 44 are reinforced by the legs to insure adequate pressure is applied at the ends of the arcuate cutouts while permitting those ends to spread apart somewhat. This spreading of the ends is best depicted in FIGS. IV and V.

The stiffening effect of the web provided by sides 21 and 22 on the bottom 19 is greatly reduced in the areas 41 and 42 such that the application of force through the tightening of nuts 16 and 17 also tends to impose a bending moment on the ends of the channel bottom 19 which carries the end members 27, 37 and 28, 38 around that region as a fulcrum. This causes the upper ends of those portions, those ends most remote from the bottom 19, to force their inner edges 47, the upper portions of edges 31, for end portions 27 and 37 and 48, the upper portions of edges 32, for end portions 28 and 38 into contact with the walls of the encompassed tube and into overlapping relationship with the end portions 43 and 44 of the center portion. The result is to generate a pressure pattern as shown in FIGS. IV and V.

As shown in FIG. IV, the inner faces 47 of end members 37 and 27 have engaged the tube wall 51 and distorted it in the regions 52 and 53. While the ends 43 of the center sections 23 and 33 have been engaged on their outermost faces by the U-bolt leg 12 which tends to force them inward and on their innermost faces by the tube wall 51 to distort that wall in the regions 54 and 55. FIG. V offers another view of the effect of the sealing tube clamp on a pair of telescoped tubes. The bight 11 of the U-bolt 10 develops pressure in a semi-circular region 56, only portions of which are shown in the drawing, while the central portions 23 and 33 of the saddle form two pressure lines 54 and 55 which are also essentially semi-circular and tend to merge as they approach the pressure line 56. In the region where these pressure lines approach, additional bordering regions of pressure are developed at 52 and 53 under the edges 47 and 48 of end portions 27, 37 and 28, 38, respectively. This overlapping of pressure areas due to the offset relationship of the several portions of the saddle which engage the tube wall provide a positive seal over the entire circumference of the tube and insure against fluid leaks.

Summarizing the invention it comprises a clamp for sealing a pair of telescoped tubes together made up of a U-bolt 10 having a bight 11 conforming along its inner surface to the outer surface of a tube and a pair of parallel legs 12 and 13. A saddle 18 cooperates with the U-bolt and is of channel form having a bottom 19 and side walls 21 and 22. Apertures 57 and 58 are formed in the bottom of the channel for receiving the ends of the U-bolt legs 14 and 15. A first or central portion of each side wall has an arcuate cutout defined by the edges 24 and 34 also generally conforming to the outer surface of the tube and extending over substantially a semi-circle. Regions of the first portions of the side walls most remote from the bottom 19, the regions 43 and 44, are offset so that they are separated by less than the thickness of the legs of the U-bolt. A second portion at each end of each side wall is separated from the first portion by a slot extending along a line generally paralleling the inner surface of the U-bolt legs and the opposed second portions bound the U-bolt legs. The ends of those second portions most remote from the bottom of the channel, ends 47 and 48, extend at least to the diameter of the semi-circular cutout and, if desired, can extend somewhat beyond the ends of that cutout. Nuts are threaded on the legs of the U-bolt and provide means to apply force to the bottom of the channel adjacent the apertures and directed along the legs of the U-bolt toward its bight whereby the end portions function as bell cranks and are pivoted to carry their inner edges into contact with the embraced tube.

While the above invention has been described in but one specific form, it is to be appreciated that it can be modified without departing from its spirit and scope. Thus, the arcuate cutout need not embrace a full semi-circle but can be substantially short of a semi-circle and the side portions of the saddle which are pivoted into engagement with the tube can be provided with arcuately cut away edges to conform to the tube and function to apply pressure transverse of the direction of force imposed on the saddle by the nuts. Further, if the separation between the center portion and end portions of the side walls is sufficient, the tube portions need not be offset with respect to each other. In view of these modifications which can be made within the spirit of the invention, it is to be understood that the present disclosure is to be interpreted as illustrative only and not in a limiting sense.

Having described the invention, I claim:

1. A clamp for sealing a pair of telescoped tubes together comprising a U-bolt having a bight generally conforming to the outer tube and a pair of parallel legs; a saddle of channel form; a bottom for said channel having a pair of apertures through which said legs pass; side walls for said channel; a first portion of each side wall having a cutout forming an arcuate lip generally conforming to the outer tube and extending substantially to a diameter parallel with said bottom; opposed first portions of said side walls being separated by less than the thickness of said legs at their limits most remote from said bottom; a second portion of each side wall separate from said first portion, bounding each leg and extending from the bottom a distance beyond the edge of said lip most proximate to said bottom at least a radius of said cutout; and means to apply a force to the bottom adjacent said apertures directed along the legs of said bolt toward said bight.

2. A clamp for sealing a pair of telescoped tubes together comprising a U-bolt having a bight generally conforming to the outer tube and a pair of parallel legs; a saddle of channel form; a bottom for said channel having a pair of apertures through which said legs pass; side walls for said channel; a first portion of each side wall having an arcuate lip generally conforming to the outer tube and extending substantially to a diameter parallel with said bottom; opposed first portions of said side walls being separated by less than the thickness of said legs at their limits most remote from said bottom; and means to apply a force to the bottom adjacent said apertures directed along the legs of said bolt toward said bight.

3. A clamp for sealing a pair of telescoped tubes together comprising a U-bolt having a bight generally conforming to the outer tube and a pair of parallel legs; a saddle of channel form; a bottom for said channel; side walls for said channel each having an arcuate lip generally conforming to the outer tube and extending substantially to a diameter parallel with said bottom; opposed first portions of said side walls being separated by less than the thickness of said legs at their limits most remote from said bottom; and means to apply a force to the bottom directed along the legs of said bolt toward said bight.

4. A clamp for sealing a pair of telescoped tubes together comprising a U-bolt having a bight generally conforming to the outer tube and a pair of parallel legs; a saddle of channel form; a bottom for said channel; side walls for said channel; a first portion of each side wall having an arcuate lip generally conforming to a portion of the outer tube; second portions of each side wall separate from said first portions along a line extending substantially to said bottom and at each end of said first portions, said second portions extending generally parallel to said legs and therealong on each side thereof, and means to apply a force to the bottom adjacent said second side portions and outward of said first side portions directed toward the bight of said U-bolt whereby the ends of said second portions most remote from said bottom are displaced as bell cranks around the region of the bottom adjacent the end of said separating line as a fulcrum transversely of said legs and against a tube wall between those legs.

5. A combination according to claim 4 wherein those regions of said first and second portions more remote from said bottom are offset with respect to each other transverse of the major faces of said sides.

6. A combination according to claim 4 wherein the regions of contact with the outer tube by said U-bolt by said first portions and by said second portions overlap around the circumference of said tube and are closely adjacent each other longitudinally of said tube.

7. A combination according to claim 4 wherein said first portions have lips defining an arc of substantially 180° and have outer limits transverse of said U-bolt bight generally parallel to and aligned with the innermost faces of said legs, said second portions have inner limits transverse of said U-bolt bight generally coincident with the innermost faces of said legs, opposed regions of said first portions most remote from said bottom being offset toward each other and having their outer limits engaged by the innermost faces of said legs.

8. A tube clamp comprising a U-bolt having a bight generally conforming to the outer surface of a tube to which the clamp is applied and a pair of parallel legs, a saddle of channel form; a bottom for said channel; side walls for said channel each having an arcuate lip complementing the arc of said bight as a continuation thereof, said side walls having slots extending substantially to said bottom and generally tangential to the arc of said bight on each side of said lip, end portions of said side walls outward of said slots, said lip and end portions being offset axially with respect to each other at their regions remote from said bottom and means to apply force to said bottom toward said bight at regions outward of said slots.

References Cited in the file of this patent

UNITED STATES PATENTS

| | | |
|---|---|---|
| 1,940,263 | McLaughlim | Dec. 19, 1933 |
| 2,719,345 | Riker | Oct. 4, 1955 |

FOREIGN PATENTS

| | | |
|---|---|---|
| 879,358 | France | Nov. 19, 1942 |